Nov. 28, 1950          R. F. STEARN          2,531,747

METAL IDENTIFIER

Filed June 12, 1947

*INVENTOR.*
ROBERT F. STEARN
BY
ATTORNEY

Patented Nov. 28, 1950

2,531,747

UNITED STATES PATENT OFFICE 2,531,747

METAL IDENTIFIER

Robert F. Stearn, Mountainside, N. J.

Application June 12, 1947, Serial No. 754,090

2 Claims. (Cl. 204—195)

This invention relates to a system for identification of metals and alloys.

It is an object of my invention to provide an instrument of simple construction and rapid operation for the identification of metals and alloys. Another object is to provide indicating means operable in response to electrolytic action for accurately measuring certain effects which differ with respect to different metals and alloys; so that when a predetermined electrolyte is used, different metals and alloys of a particular group may be distinguished and sorted.

An identification instrument of the type which I have invented has a wide range of utility. It may be used in metal working shops and in establishments which handle scrap metals, where the metals and alloys being handled are of unknown composition. My invention is also useful in assaying precious metals, such as gold.

A preferred embodiment of my invention has been constructed which is of light weight and has very few components. It requires no connection with any outside source of current.

Figure 1:
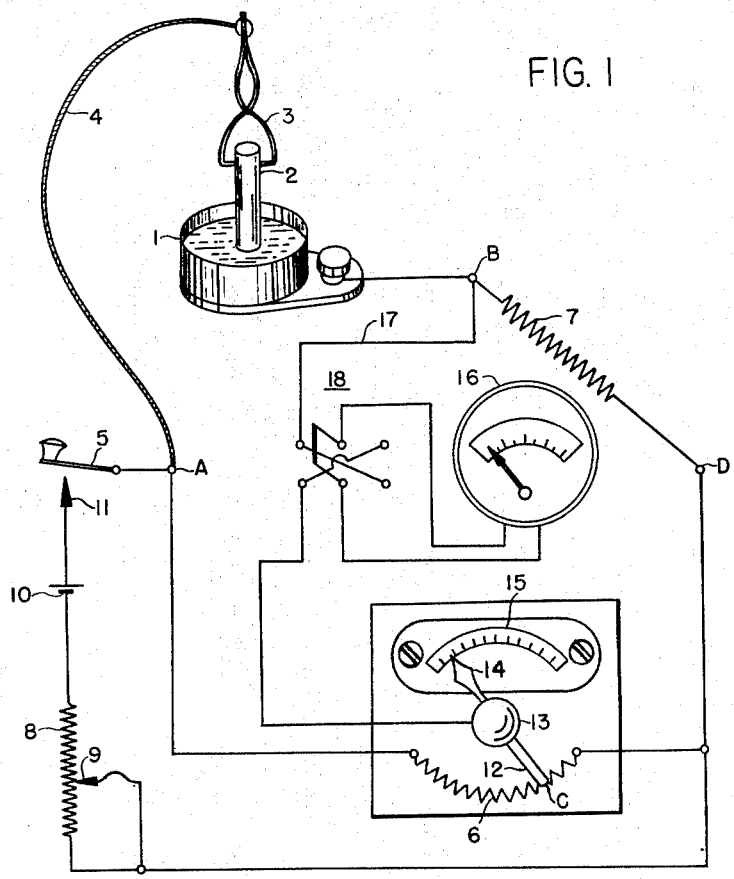
Figure 2:
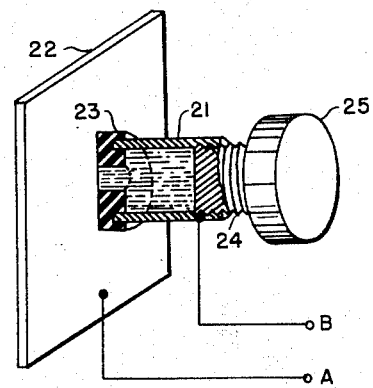

The invention will now be described in more detail, reference being made to the accompanying drawing, wherein Figure 1 represents testing apparatus for identification of relatively small metallic specimens, and Fig. 2 shows a modification of the electrolytic cell which is useful for testing a piece of metal too large to be inserted within the cell proper.

Fig. 1 shows a preferred circuit arrangement having two indicating means 15 and 16, either one of which may be calibrated to indicate directly a symbol for the metal or alloy which is under test. The specimen to be tested is first cleaned, at least over an area of its surface which is to be subjected to electrolytic action. The receptacle 1 is metallic and contains an electrolyte the composition of which is chosen according to a particular group of metals and/or alloys to be sorted.

The receptacle 1 may be composed of a material which has a cathodal relation to the sample to be tested. This, however, is not always necessary. In most applications of the device Inconel metal is preferably used as the composition of the receptacle 1. Other metals which preferably would act as a cathode with respect to the metal to be tested may also be chosen. The metal to be tested is indicated at 2 and it may be held by a clip 3 on the end of a flexible wire 4. The wire 4 is connected both to a key 5 and to one terminal of a potentiometer 6. The other terminal of this potentiometer is connected to the receptacle 1 through a resistor 7. The junction between elements 6 and 7 is also connected to a rheostat 8 which has a variable tap 9 connected to the negative terminal of a direct current source 10. This source may, if desired, consist merely of a single dry cell such as used in a flash lamp. The positive terminal of the source 10 is connected to a contact 11 under the key 5.

The movable tap 12 on potentiometer 6 is preferably controlled by means of a knob 13 for manual adjustment. This knob has a pointer 14 which may be moved over a scale 15 for indicating a certain balance in the effective bridge circuit, the components of which have been described as above. The movable tap 12 is connected through a galvanometer 16 and thence through a conductor 17 to the receptacle 1.

The circuit arrangement as above described will be recognized as having the same components as a Wheatstone bridge. That is to say, it constitutes essentially four interconnected impedance branches of diamond formation, the battery 10 being connected across terminals A and D, and the galvanometer 16 being connected across terminals B and C. The arm A—B contains the metal to be tested; the arm B—D is of fixed ohmic value, being that of resistor 7; and the arms A—C and C—D are complementary portions of the potentiometer 6. Adjustment of the bridge to a balancing condition is shown by a zero indication on the galvanometer 16. Upon obtaining this balance the ohmic values of the respective bridge arms will satisfy the equation:

$$\frac{A-B}{A-C}=\frac{B-D}{C-D}$$

Therefore, since the value of the arm B—D remains fixed, it is apparent that the value of the impedance offered by an oxide film formed on the sample to be tested may be precisely indicated by adjustment of the position C of the movable tap on the potentiometer 6. The impedance of the oxide film on the tested sample is, however, a variable quantity with which the action of the electrolyte in the container 1 is combined as another variable. These two effects in combination are specific to a given metal or alloy, and therefore sufficient to identify the sample within very close tolerances.

In circuit with the meter 16 I have placed a reversing switch 18. Of course there would be no need of this if the scale of the instrument were to be graduated for + and — readings on the two sides of a mid-zero indication. But since a more extended scale may be had by placing the zero mark at one end thereof, it is sometimes preferable to use an instrument with scale markings for unidirectional current flow and then to provide a polarity reversing switch in circuit with the instrument. The need for this will be better understood from the following considerations:

The electrolytic effects obtained in testing a given metallic specimen are generally the resultant of a number of contributing factors of which the following are the most pronounced:

(1) The E. M. F. of the external source, namely the battery 10.

(2) The E. M. F. generated within the electrolytic cell 1, the polarity being either the same or opposed to that of the external source, depending upon the position which the specimen 2 occupies in the so-called "replacement series of metals" with respect to the metal of the receptacle 1.

(3) The composition and concentration of the electrolyte.

When the electrolyte is traversed by an electric current hydrogen is collected and liberated at the cathode, while oxidation takes place and forms a film on the surface of the specimen under test. The impedance of the bridge arm A—B is, accordingly, varied as a function of the electrolytic effects whose factors are (1), (2), and (3) as above stated.

Active metals, such as magnesium, zinc, tin and lead, when used in the place of the anode 2, produce a considerable galvanic action, that is, they are readily attacked by the electrolyte. The noble metals such as copper, silver, platinum and gold are only attacked to a slight degree and only by certain particular electrolytes.

The instrument 16 may be either a galvanometer or a milliammeter. In any case it indicates a difference of potential or a balance between points B and C of the bridge. If the rheostat knob 13 is adjusted so that there is virtually no resistance between points A and C, then the current generated by galvanic action between electrodes 1 and 2 may be measured independently of the current from the battery 10. In fact, the circuit of battery 10 may be open at the key 5.

If an embodiment of my invention were to be used primarily for identifying the active metals, then it would be preferable to calibrate the scale of the meter 16 so that the different metals and alloys could be read directly on this scale when the rheostat arm C is set, say, to the extreme left, making its potential the same as that of point A and the specimen 2. The switch 18 would then be thrown to the proper side to show a positive reading on the meter scale, assuming that its zero mark is at one end thereof.

The utility of my invention is shown by the carrying out of the following procedure, where, as a specific example, it may be desired to distinguish only between two different specimens of the Hastelloys. Let it be assumed that specimens of Hastelloy A are to be distinguished from those of Hastelloy B. Using an electrolyte for such tests as is shown to be suitable according to a tabulation hereinafter shown, that is, electrolyte F, and dipping the sample into the chosen electrolyte, it will be found that when the metal is Hastelloy A the milliammeter or galvanometer 16 will show substantially full scale deflection almost immediately after closing the switch key 5. A sample of Hastelloy C, however, will produce almost no deflection of the instrument needle. Under the assumed conditions for this type of metal separation I do not claim that the presence of other metals than those contained in the samples subjected to test would readily be distinguished. It is obvious, however, that by properly calibrating the scale 15 other alloys may readily be distinguished in respect to the relative proportions of the metals present in a given sample.

The process of separation of different specimens, as described in the preceding paragraph represents one of the simpler uses of my invention where the characteristics of Hastelloy A and of Hastelloy B are so different that they can be distinguished without previous calibration of the milliammeter scale or the scale of the potentiometer. When, however, certain other metals and/or alloys are to be classified, either the milliammeter scale or the scale 15 which underlies the potentiometer pointer 14 must be carefully calibrated. This is true because, in making such comparisons, full-scale differences of indication are the exception rather than the rule.

With the switch 18 reversed in respect to its position for testing the active metals, other metals which become passive due to rapid polarization may be tested by setting the rheostat at a predetermined point and reading the meter scale, provided the different metals are marked thereon. Preferably, however, for such use the rheostat would be placed within the chassis of the apparatus and adjusted at the factory so as not to be disturbed by the user.

To give another illustration of utility of my invention for the separation of two specific alloys, let it be assumed that two types of stainless steel, #304 and #316 are thus to be distinguished. The composition of these metals is given in the ensuing tabulation. The recommended procedure is as follows: A small wire sample of either type of stainless steel is secured to the clip 3. The key 5 is closed and approximately a half-inch length of the wire sample is submerged in an electrolyte composed of dilute hydrochloric acid, the strength being as specified in column E of the said tabulation. The instrument 16 will almost immediately show a full scale deflection when the sample tested happens to be type 304 stainless steel, and will show substantially no deflection when the sample is type 316 stainless steel. The apparatus when adjusted to distinguish between these two types of stainless steel is obviously not intended to be used for identifying other metals. But usually the need for a metal identifier in industrial establishments is best met by adjusting and calibrating the instrument to carry out repetitive tests on large quantities of samples which vary only in a limited sense.

When using an instrument 16 which has its zero-mark at the center of the scale the rheostat scale 15 may be graduated with marks which are labeled with proper symbols for indicating the identity of certain metals and alloys when using a specific electrolyte and when adjusting the rheostat to give a zero reading on the instrument 16. This arrangement is often preferable for the identification of the nickel alloys, copper, bronze, iron and various grades of steel, also the precious metal group. Different scales 15 may be used alternatively for different groups of metals. These scales, however may be readily interchanged by the use of suitable mounting screws or otherwise. They are also calibrated for use with the switch 18 always thrown to one predetermined position.

When the specimen is first placed in the electrolyte and made anodic with respect to the Inconel metal of the cup 1, key 5 being closed, the applied current sets up corrosion of the anode 1. The galvanic action may at first cause current to flow one way through the instrument and after a moment or two the current may be reversed, even though no adjustment is made in the setting of the rheostat knob 13. Presently, however, the oxide film will be formed on the specimen so as to cut down the current through the bridge arm A—B and a substantially stable condition will be established, depending upon the solution chosen as the electrolyte, the setting of the potentiometer tap 12, and the metals that are to be tested. A minute or two is usually sufficient. Then the rheostat can be adjusted to give a zero reading on the instrument 16 and the identity of the metal will be shown on the scale 15.

In the tabulation which appears further on in this specification the composition of certain alloys of the Hastelloy group is given. These are Hastelloys A, B, C and D. They may be distinguished by carrying out the following procedure: The composition of the preferred electrolyte is as given in column F of said tabulation. A pre-calibrated scale 15 is chosen especially for testing the Hastelloys. On the scale the letters A, B, C and D are so positioned as to identify a corresponding one of the Hastelloys by moving the pointer 14 along this scale until a zero reading is obtained on the instrument 16. Approximately one minute should elapse after closing the switch key 5 in order to establish a stable condition of the current flow through the bridge, since the film formed by the electrolyte on the surface of these Hastelloys does not approximate its maximum ohmic value in less than a minute. By carrying out this method, however, the different Hastelloys may readily be distinguished.

An alternative construction of the electrolytic cell is shown in Fig. 2. Here the receptacle 21 is internally threaded to receive a screw plug 24 having a head 25 of convenient size for manipulation. At the other end is an orificed disc 23. The receptacle 21 is composed preferably of Inconel metal and is used as the cathode. The plate 22 is a specimen of metal to be identified and is connected to point A of the Wheatstone bridge. The receptacle 21 is connected to point B of the bridge and is insulated from the anodal plate 22 by means of the disc 23 which is made of insulating material.

Now after filling the receptacle 21 with an electrolyte of paste-like consistency its insulated end may be held against the surface of the specimen 22; the screw-head 25 may be turned sufficiently to force an extrusion of some of the electrolyte through the orifice of the disc 23 and into contact with the plate 22, thus completing a circuit between points A and B of the bridge. So a specimen which is too large to be inserted in a receptacle like that of Fig. 1 may readily be identified. Instead of bringing the specimen to the test apparatus the latter is brought to the specimen.

Although I have used liquid solutions for the different electrolytes required in the identification of different groups of metals, it has been found preferable to thicken the electrolyte into a paste or slurry by the addition of a relatively inert material such as fuller's earth. For distinguishing different metals and alloys of a given group, and for setting up certain standard conditions as a basis for the calibration of the interchangeable scales 15 I have made a somewhat arbitrary selection of electrolytes which, however, has been found well suited to the work of identifying metals in different groups. Other selections might, of course, be made without departing from the spirit of the invention. Scales 15 may also be calibrated with respect to the use of other electrolytes and other cathode material than Inconel metal. Illustratively, however, the following tabulation is indicative of the wide range of tests which can be made for the identification of metals and alloys in many groups.

| Identity | Composition of Alloys, Per Cent | | | | | | | Electrolyte |
|---|---|---|---|---|---|---|---|---|
| | Au | Cu | Pb | Te | Zn | Sn | Sb | |
| Gold: | | | | | | | | |
| 10 carat | 42 | 58 | | | | | | A |
| 14 carat | 58 | 42 | | | | | | A |
| Phosphor bronze | | 95 | | | | 5 | | B |
| Bronze | | 85 | 5 | | 5 | 5 | | B |
| Antimony lead | | | 90 | | | | 10 | C |
| Tellurium lead | | | 95 | 5 | | | | C |

| | Composition of Alloys, Per Cent | | | | | | | | Electrolyte |
|---|---|---|---|---|---|---|---|---|---|
| | Al | Cu | Ti | Zn | Cr | Fe | Si | Mn | Mg | |
| Aluminum alloy 17t | Bal. | (¹) | .15 | .1 | .1 | .7 | .8 | {.4-1.0} | {.2-.8} | D |
| Aluminum alloy 2s | 98.6 | .2 | | .1 | | (²) | (²) | | .1 | D |

¹ 3.5 (minimum), 4.5 (maximum).
² Fe+Si=1.0.

| | Composition of Alloys, Per Cent | | | | | | | | Electrolyte |
|---|---|---|---|---|---|---|---|---|---|
| | Ni | Cu | Mo | W | Al | Cr | Fe | Si | Mn | |
| Stainless steel #304 | 8 | | | | | 18 | 74 | | | E |
| Stainless steel #316 | 8 | | 3 | | | 18 | 71 | | | E |
| Nickel | 100 | | | | | | | | | F |
| Monel metal | 70 | 30 | | | | | | | | F |
| Hastelloy A | 66 | | 22 | | | | 22 | | | F |
| Hastelloy B | 62 | | 32 | | | | 6 | | | F |
| Hastelloy C | 53 | | 19 | 5 | | 17 | 6 | | | F |
| Hastelloy D | 85 | 3 | | | 1 | | | 10 | 1 | F |

*Electrolytes referred to in last column above*

|  | sp. gr. | A | B | C | D | E | F |
|---|---|---|---|---|---|---|---|

SOLUTIONS, PER CENT BY VOLUME

| | sp. gr. | A | B | C | D | E | F |
|---|---|---|---|---|---|---|---|
| Sulfuric acid | 1.84 | | | 5 | | | |
| Hydrochloric acid | 1.19 | 10 | | | | 2.5 | |
| Nitric acid | 1.42 | | | | | | 10 |
| Potassium monobasic phosphate | | | 10 | | | | |
| Sodium chloride | | | | | 10 | | |
| Water | | 90 | 90 | 95 | 90 | 97.5 | 90 |

ALTERNATIVE SOLUTIONS

| | | A | B | C | D | E | F |
|---|---|---|---|---|---|---|---|
| Potassium chlorate | | | | 5 | | | |
| Calcium chloride | | | | | | 10 | |
| Ammonium sulfate | | | | | | | 10 |
| Sodium thio-sulfate | | | | | 10 | | |
| Water | | | | 95 | 90 | 90 | 90 |

PASTES OR SLURRIES, PER CENT BY WEIGHT

| | sp. gr. | A | B | C | D | E | F |
|---|---|---|---|---|---|---|---|
| Sulfuric acid | 1.84 | | | 10 | | | |
| Hydrochloric acid | 1.19 | 19 | | | | 10 | |
| Nitric acid | 1.42 | | | | | | 16 |
| Potassium monobasic phosphate | | | 15 | | | | |
| Sodium chloride | | | | | 15 | | |
| Water | | 30 | 45 | 50 | 45 | 53 | 38 |
| Fuller's earth | | 51 | 40 | 40 | 40 | 37 | 46 |

If a completely unknown metal or alloy is to be identified, certain preliminary tests should be made before finally resorting to the electrolyte which is best suited for exact identification. One of these preliminary tests may be made by a solution or paste of sodium chloride. This will classify the metal as within one or another of the following groups: aluminum, iron base, nickel alloys, etc. After this initial classification, the metal is subjected to the further test which establishes its specific identity.

If the testing instrument is to be used exclusively for just one group of metals or alloys, it is then possible to calibrate the scale of the galvanometer 16 for the range of metals or alloys within that particular group. In this case, the potentiometer 6 is not provided with a manual adjustment knob 13 but is mounted within the housing of the instrument and is adjusted in the process of manufacture so as to provide a means for identifying metals or alloys with great facility and without any particular skill being called for on the part of the user. Such an instrument may, for example, be placed in an assay office where old gold is being bought. The number of carats at which the gold is assayed may be directly indicated on the scale of the galvanometer. When the instrument is used in this manner, the electrolyte which is found most efficient is composed of 38% hydrochloric acid (sp. gr. 1.19) and 62% water by volume.

In the foregoing specification and in the tables I have set forth the possible uses of certain electrolytes in connection with the testing of various groups of metals and alloys. It will be understood, however, that what is shown is merely illustrative and that my invention is capable of a far more extended use than merely to identify the particular metals and alloys which have been mentioned. The spirit and scope of the invention is, therefore, not limited to these exemplary cases.

I claim:

1. Apparatus for identifying certain of the metals and alloys, comprising an electrolytic device the cathode of which is constituted as a receptacle for the electrolyte and the anode of which is a specimen of the metal or alloy to be identified, in combination with means so calibrated as to directly indicate the identity of the specimen, said means comprising a potentiometer having a movable tap, an indicating pointer to which said tap is mechanically coupled, said tap and pointer being manipulatively adjustable as a unit, a plurality of calibration scales an appropriate one of which is selectable for use when metals or alloys of a predetermined group are to be identified, the selected scale being disposed in underlying relation to said pointer and bearing indicia respecting the metals or alloys of the selected group, a bridge circuit one of the arms of which consists of said electrolytic device, another arm in series therewith being of fixed resistance value, and said potentiometer constituting two series-connected arms with respect to which the aforesaid arms of the bridge are parallel-connected, a direct current supply connected across the junctions at the ends of said potentiometer, and a direct current measuring instrument connected between two junction points of said bridge circuit for indicating potential differences between said junction points, one point being the potentiometer tap and the other point being the junction between the arms first mentioned, whereby the potentiometer adjustment when made to produce a zero-reading of the measuring instrument will show the metallic identification of the specimen by reference to the position of said pointer along the scale.

2. Apparatus for testing specimens of different metals or alloys to classify them as to their metallic content, comprising an electrical network having two parallel resistance branches, means connected across certain points, one on each of the network branches for determining two intermediate points of equal potential therein, a direct current supply connected across the terminals of the network, an electrolytic cell constituting a portion of one of the branches, which portion extends from the positive terminal of said supply to the connection of said means thereto, said cell having as its anode one of said specimens to be tested, manipulatable adjusting means affecting the position of one of said points for varying the resistance values of two portions of the other of said branches in a complementary sense, thereby to balance the network, the balance when obtained being of significance after continuance of electrolytic action in said cell for only so long as to substantially stabilize the formation of a film deposit on said specimen, and indicating means of the scale and pointer type operatively combined with said adjusting means and suitably calibrated for manifesting the classification of the tested specimen under the conditions of network balance and stabilized formation of said film deposit.

ROBERT F. STEARN.

REFERENCES CITED

The following references are of record in the file of this patent:

UNITED STATES PATENTS

| Number | Name | Date |
|---|---|---|
| 1,601,383 | Todd | Sept. 28, 1926 |
| 1,845,231 | Browning | Feb. 16, 1932 |
| 1,942,046 | Bottome | Jan. 2, 1934 |
| 2,183,531 | Allison | Dec. 19, 1939 |
| 2,319,196 | Anderson et al. | May 18, 1943 |

OTHER REFERENCES

"Electrochemistry," by Creighton et al., vol. 1 (1924), page 186.

"Theoretical and Applied Electrochemistry," by Thompson (1925), page 31.